UNITED STATES PATENT OFFICE.

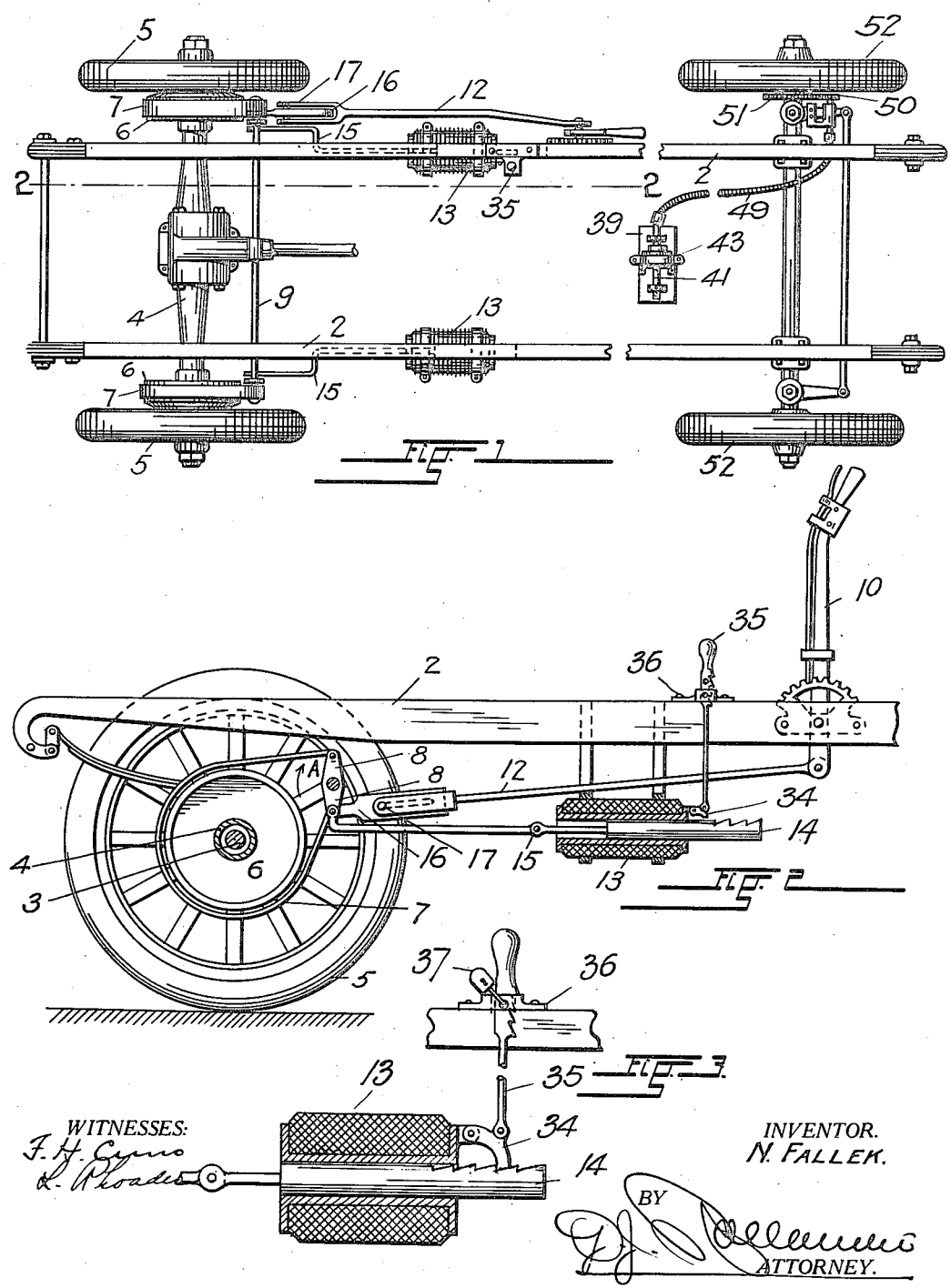

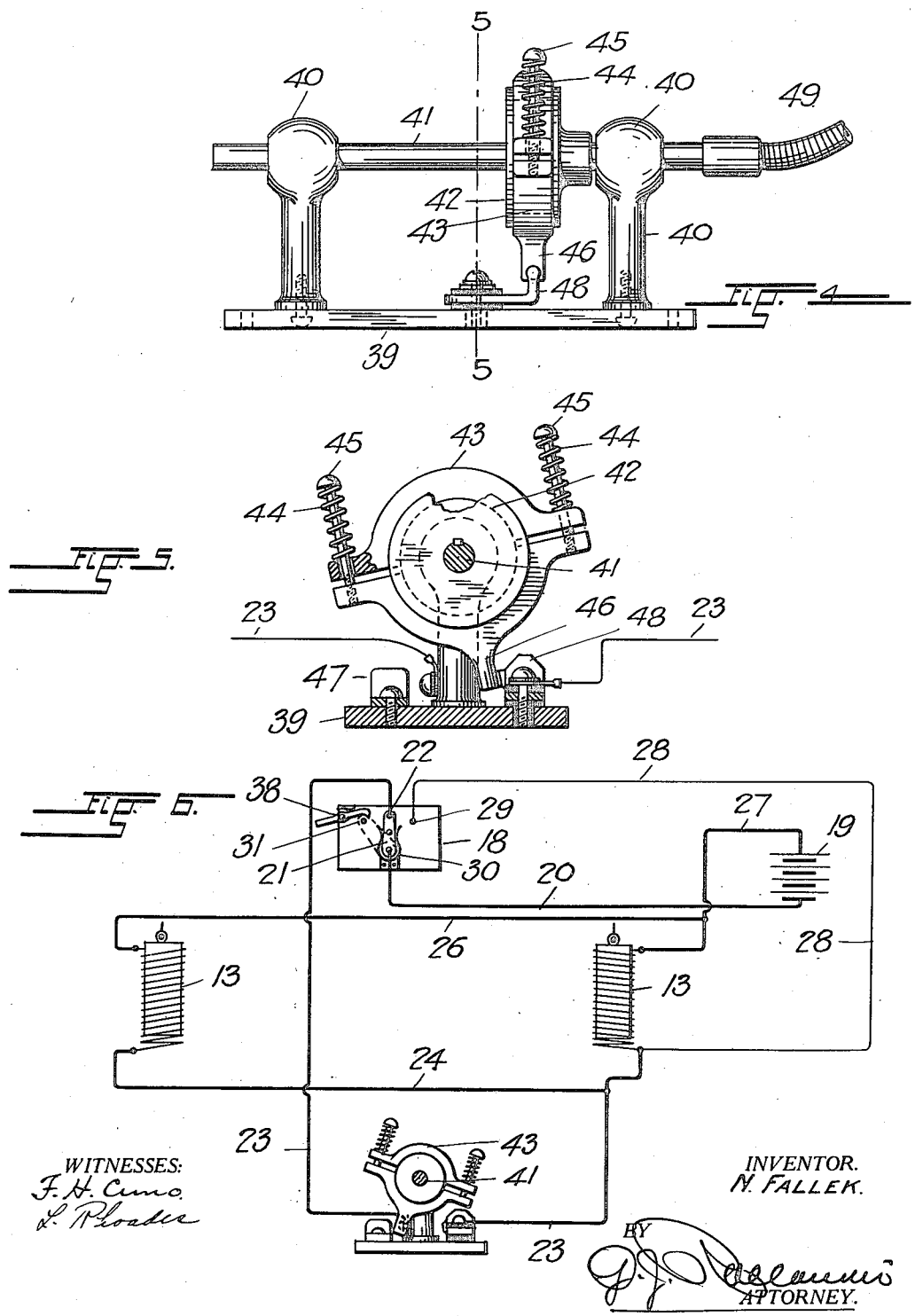

NATHAN FALLEK, OF DENVER, COLORADO.

BRAKE SYSTEM.

1,210,444.  Specification of Letters Patent.  Patented Jan. 2, 1917.

Application filed May 11, 1914. Serial No. 837,820.

*To all whom it may concern:*

Be it known that I, NATHAN FALLEK, a citizen of the United States, residing at Denver, in the county of Denver and State of Colorado, have invented certain new and useful Improvements in Brake Systems, of which the following is a specification.

This invention relates to a system of operating brakes on vehicles and other moving bodies, and its primary object resides in providing a system of coöperative devices by which one or more brakes are automatically actuated to retard or arrest the motion of a rotating body when its movement is reversed.

Another object of my invention resides in providing in combination with one or more band brakes, solenoids which operate the same when energized by a flow of current through the circuit in which they are connected.

A further object of the invention is to establish the operative connection between the brakes and an electric operating appliance, independent of and in addition to the ordinary mechanical operating devices, such as the hand levers commonly employed, so that the brakes may be actuated either by means of said devices or through the agency of the electric appliance, and still another object of the invention resides in providing in association with an electrical brake-operating appliance, means for locking the brakes in their operative condition, independent of the action of said appliance, after they have been set by energization thereof.

While my invention may be applied to rotary bodies of different character, it is particularly adapted for use in connection with the wheels and axles of self-propelled vehicles, to afford simple and effective means for arresting the movement thereof, either at the will of the driver of the vehicle, or automatically, by the reverse movement of the wheels and axles when, beyond control of its operator, the vehicle commences to move rearwardly.

The principal purpose in devising the automatic feature of my improved brake system is to prevent the accidents which frequently occur by reason of accidental backward movement of automobiles while climbing steeply inclined roads, either by breakage of the operating mechanism of the vehicle or by failure of the driver to properly control the movements of the same.

An embodiment of my invention has been shown in the accompanying drawings in the various views of which like parts are similarly designated, and in which—

Figure 1 represents a fragmentary plan view of the chassis of an automobile to which my improved brake-system has been applied. Fig. 2, an enlarged section taken along the line 2—2, Fig. 1. Fig. 3, a sectional elevation of one of the solenoids used in my electric brake-operating system, showing the therewith associated locking-device in its operative position, Fig. 4, an elevation of the automatic switch used in the electric system for operating the brakes, Fig. 5, a section taken along the line 5—5, Fig. 4, and Fig. 6, a diagrammatic view of the electric circuits in which the brake-operating devices comprised in the system are coöperatively connected.

Referring more specifically to the drawings, the reference character 2 designates the chassis of a self-propelled vehicle, and 3 one of the axles of the same which, as usual, rotates in a stationary sleeve 4 and which at its ends carries the road-wheels 5. Rigidly connected with the wheels, are friction wheels 6 which are partly encircled by brake-bands 7 the ends of which are connected with opposite crank arms 8 on a rocker shaft 9.

The mechanical means for operating the brakes by tightening the bands around the respective wheels, comprises as usual an operating lever 10 which is connected with one of the crank arms on the rocker shaft by means of a rod 12. The electric appliance for operating the brakes in accordance with my invention, comprises two solenoids 13, the longitudinally slidable cores or armatures 14 of which are by means of rods 15 connected with the extremities of one of the crank arms of the two pairs connected with the ends of the brake bands. When by a flow of current through an electric circuit in which the solenoids are connected, their coils are energized, the consequent outward movement of their cores will cause the rocker shaft to move about its axis of rotation in the direction of the arrow A in Fig. 2, with the result that the bands are tightened around the respective friction wheels and the rotary movement of the wheels 5 is in consequence arrested. By establishing the connection between the rod 12 and the crank arm on the rocker shaft through the intermediary of a bar 16 which is pivotally connected with the end of the crank arm and longitudinally slotted to receive a pin 17 on the forked extremity of the rod, the solenoid cores are permitted to operate the brakes independent of the operating lever, while the latter may be employed to rotate the rocker shaft, as usual, without any effect on the electric operating appliances other than a sliding movement of the cores of the solenoids through their normally deënergized coils.

The brakes may be maintained in their operative condition, for an indefinite period, after they have been set by energization of the solenoids, and without the consumption of electrical energy, by means of a mechanical locking-device which in its preferred form, consists, as best shown in Fig. 3 of the drawings, of a dog 34 which is pivoted on one of the solenoids, to engage ratchet teeth formed in the rear-end portion of the core thereof. A pull-rod 35 which slides in a bearing 36 on the chassis or other part of the vehicle, is pivotally connected with the dog to move it into or out of engagement with the teeth of the solenoid-core, and by providing the said bearing and the rod with holes which register when the dog 34 is in its active position, the latter may be locked to prevent unauthorized removal of the vehicle, by inserting the shackle of a padlock 37 through the registering holes, and locking the same by means of a key. The solenoids are connected in an electric circuit 18 the flow of current through which is controlled by a switch disposed within easy reach of the driver of the vehicle.

To automatically complete the circuit for energization of the solenoids when the movement of the axle, wheels or other rotary body to which the brake-system is applied, is accidentally reversed, I employ the electrical connections shown diagrammatically in Fig. 6 of the drawings. The solenoids are connected in multiple in a circuit which commencing at one of the poles of a source of electricity 19 includes a conductor 20 which connects the pole with the adjustable arm 21 of the two-point switch 18 which is controlled by the driver of the vehicle. A contact 22 on the switch is by means of a conductor 23, connected with a wire 24 which connects corresponding ends of the solenoid coils, and this conductor is normally broken in an automatic switch 25 the construction of which will hereinafter be described. The opposite corresponding ends of the solenoid coils are connected with the other pole of the source 19 by means of conductors 26 and 27, and a shunt 28 connects the solenoid-connecting wire 24 with an insulated contact 29 of the switch 18 for the purpose of cutting the automatic switch out of the circuit when the driver desires to set the brakes independently thereof.

The operating arm 21 of the switch is as shown in Fig. 6, normally positioned to close the above described circuit by engagement with the contact 22, it being maintained in its said position by means of a bow-spring 30 which engages its opposite sides. The automatic circuit controlling switch which normally is in an open condition, is thus the only medium which under ordinary circumstances prevents energization of the solenoids, and it is actuated to close the circuit, only when the movement of the rotary body to which the brakes are applied, is unintentionally reversed. In case the driver of the vehicle desires to move the same rearwardly, he opens the circuit in the switch 18 by separating the arm 21 from the contact 22 to the position indicated at 31, thereby preventing energization of the solenoids when the circuit consequent to the rearward motion of the axle, is closed by the automatic switch.

For the purpose of maintaining the switch-arm in its adjusted position after it has been moved to open the circuit when the brakes are locked in their operative position by the locking device hereinbefore described, the switch may be provided with any suitable means for retaining the arm such as the catch 38 shown in Fig. 6. When it is desired to set the brakes through the medium of the electric operating appliance independent of the automatic switch, the latter is cut out from the circuit and the circuit is at the same time closed by moving the arm of the switch 18 to engagement with the contact 29, thereby establishing a direct connection between the pole of the source connected with the arm, and the wire 24 connecting the ends of the solenoid coils, through the intermediary of the shunt 28. By the provision of the spring 30, the arm 21 is automatically returned to its normal position when it is released after the driver has moved it to either the position 31 to break the circuit for the purpose of moving the vehicle rearwardly independent of the automatic brake setting appliance, or for the purpose of discontinuing the flow of current through the electric system when the brakes are held in their active condition by the locking device, or to the position in which it engages the contact 29 when he desires to cut the automatic switch out of the circuit for the purpose of setting the brakes to arrest forward motion of the vehicle. It will thus be seen that under normal circumstances the circuit is always in a condition to be closed by the operation of the automatic circuit controlling device, and that the latter can be rendered temporarily ineffective only by action of the driver of the vehicle.

The automatic switch may be of any design or construction capable of converting a reverse motion of the rotary body to which the brakes are applied, into a circuit closing movement of its coöperative contact members, and it may be operatively associated with the rotary body directly, or with any part of the operating mechanism of the vehicle or other appliance, the motion of which is affected by the reversal of the movement of the said body.

The automatic switch shown in Figs. 4 and 5 of the drawings comprises a baseplate 39 which carries two standards 40 for the rotary support of a shaft 41. A flanged collar 42 which is keyed on the shaft, is encircled by a ring 43 composed of two halves which are yieldingly held in frictional engagement with the peripheral face of the collar by means of helical springs 44 which are coiled around headed bolts 45 secured to one of the halves of the ring, to extend loosely through openings in the other half of the same. The ring 43 has a downwardly projecting finger 46 to engage one or the other of two stops 47 and 48 which are secured upon the base plate at opposite sides of the finger. One of the stops 48, is insulated from the base and connected with one of the terminals of the break in the conductor of electricity in which the switch is disposed, the opposite terminal being secured to a suitable metallic part of the switch, such as one of the standards 40, to place it in electrical connection with the ring 43. The shaft 41 is connected with a rotary part of the vehicle to move in unison therewith, so that during forward movement of the vehicle the finger 46 on the collar is held in engagement with the stop 47, while when the movement of the vehicle is reversed, the ring 43 moves with the collar 42 on the shaft until its finger engages the stop 48 and thereby completes the normally open circuit in which the said stop and the collar are connected.

While the operative connection between the shaft 41 and a rotary part of the vehicle may be established in any suitable manner, I preferably employ for this purpose, a flexible shaft 49 which at one of its ends is connected to the shaft and which at its opposite end carries a pinion 50 for engagement with a gear-wheel 51 attached to one of the front-wheels 52 of the vehicle, as shown in Fig. 1 of the drawings. By thus connecting the shaft for coaction with a rotary body on the vehicle, the automatic switch may be disposed on the vehicle wherever it is most convenient.

Since the operation of my improved brake-operating system has been referred to at intervals in the course of the foregoing description, it will only be necessary to briefly outline it at this point. When the driver of a vehicle desires to arrest the movement thereof under ordinary conditions, he sets the brakes either by means of the operating lever 10 or by energizing the solenoids which he accomplishes by moving the switch arm 21 into engagement with the contact 29. To move the vehicle rearwardly without the brakes being set by the action of the automatic switch, the driver holds the switch arm during such movement, in the position designated in the drawings by the numeral 31, thereby opening the circuit in the switch 25. When during forward movement of the vehicle, its motion is unintentionally reversed, the automatic switch is through the medium of the flexible shaft, immediately actuated to bring its contact-members 46 and 48 in engagement. This closes the normally open circuit and energizes the solenoids which by consequent movement of their cores, tighten the brake bands around the respective friction wheels through the instrumentality of the rocker shaft 9. If, after the brakes have been set by actuation of the electric operating appliances, the driver desires to prevent rearward rotation of the vehicle for any length of time without the consumption of electric energy, he can accomplish this purpose and at the same time secure the vehicle against unauthorized removal, by lowering the pull-rod until the dog engages the teeth of the solenoid core, moving the arm of the switch 25 in engagement with the catch 38, and locking the pull rod in its adjusted position by the padlock mentioned hereinbefore, or by any other suitable means.

Having thus described my invention what I claim and desire to secure by Letters-Patent is:

1. The combination with a rotary body and a brake for arresting the movement thereof, of electrical means for the operation of said brake in a normally open circuit, and means actuated by movement of said body in one direction to close the circuit for the operation of said means.

2. The combination with a rotary body and a brake for arresting the movement thereof, of an electric appliance for the operation of the brake in an electric circuit, a hand-switch controlling said circuit for the operation of said appliance, and a second switch actuated by movement of said body in one direction to close the circuit for the automatic operation of said appliance.

3. The combination with a rotary body and a brake for arresting the movement thereof, of an electric appliance for the operation of the brake in an electric circuit, a switch actuated by movement of said body in one direction, for closing said circuit to automatically operate the said appliance, and a hand-switch controlling said circuit and capable of preventing the closing of the circuit by means of the first-mentioned switch during the said movement of the said body.

4. The combination with a rotary body and a brake for arresting the movement thereof, of an electric appliance for the operation of the brake in an electric circuit, a switch actuated by movement of said body in one direction for closing said circuit to automatically operate the said appliance, and a hand-switch controlling said circuit, and capable of preventing the closing of the circuit by means of the first-mentioned switch during the said movement of the said body, and of effecting the energization of said appliance independent of the operation of the first-mentioned switch.

5. The combination with a rotary body and a brake for arresting the movement thereof, of an electric appliance for the operation of the brake in an electric circuit, a switch actuated by movement of said body in one direction for closing said circuit to automatically operate the said appliance, and a hand-switch controlling said circuit and capable of effecting the operation of said appliance independent of the first-mentioned switch.

6. The combination with a rotary body and a brake for arresting movement thereof, of an electric appliance for the operation of said brake, an electric circuit in which said appliance is connected, a switch in a break of said circuit, capable of closing the same by the movement of said body in one direction, a hand switch normally maintaining said circuit in condition for the effective operation of the first-mentioned switch, and capable of adjustment for varying the flow of current through the circuit, to energize the said appliance independent of the first-mentioned switch.

7. The combination with a rotary body and a brake for arresting movement thereof, of an electric appliance for the operation of said brake, an electric circuit in which said appliance is connected, a switch in a break of said circuit, capable of closing the same by the movement of said body in one direction, a hand switch normally maintaining said circuit in condition for the effective operation of the first-mentioned switch, and a shunt connected to cut the first-mentioned switch out of the circuit and effect energization of the appliance independent of the same, by adjustment of said hand switch.

8. The combination with a brake and an electrical appliance for operating the same, of key-controlled means for locking said brake in its active condition, independent of the action of said appliance.

9. The combination with a brake and an electrical appliance for operating the same, of a device for maintaining said brake in its active condition independent of the action of said appliance, and means for locking said device in its operative position.

10. The combination with a brake and an electrical appliance for operating the same, of a device for maintaining said brake in its active condition independent of the action of said appliance, and key-controlled means for locking said device in its operative position.

11. The combination with a brake and an electric appliance for operating the same, of a mechanical device for maintaining said appliance in its brake-actuating condition, and means for locking said device in its operative position.

12. The combination with a brake, of a solenoid having a toothed core operatively connected therewith, a dog disposed to engage a tooth on said core for holding it in its brake-actuative position, and manually operated means for moving said dog in engagement with said tooth.

13. The combination with a brake, of a solenoid having a toothed core operatively connected therewith, a dog disposed to engage a tooth on said core for holding it in its brake-actuative position, and key controlled means for locking said dog in its tooth-engaging position.

14. The combination with a vehicle and a brake for arresting the movement thereof, of an electric appliance in a circuit for the operation of the brake, a flexible shaft connected to be rotated by the movement of a wheel of the vehicle, and a switch in said circuit held in one of its circuit-controlling positions during movement of the shaft in one direction and adapted to move in conjunction with the shaft to reverse the condition of the circuit during movement of the shaft in the opposite direction.

15. The combination with a vehicle and a brake for arresting the movement thereof, of an electric appliance in a circuit for the operation of the brake, a shaft connected to be rotated by the movement of a wheel of the vehicle at a point remote from said wheel, and a switch in said circuit held in one of its circuit-controlling positions during movement of the shaft in one direction and adapted to move in conjunction with the shaft to reverse the condition of the circuit during movement of the shaft in the opposite direction.

16. The combination with a body movable in opposite directions, including a rotary part, an electric brake operating appliance in a circuit, a shaft connected to be rotated by the movement of said part at a point remote therefrom, and a switch in said circuit held in one of its circuit-controlling positions during movement of the shaft in one direction and adapted to move in conjunction with the shaft to reverse the condition of the circuit during movement of the shaft in the opposite direction.

17. In an electric brake system, the combination with a brake of a vehicle, of an electric appliance in operative connection with said brake, a switch in circuit with said appliance, and an automatic switch in circuit with said appliance and connected with a rotary part of the vehicle to be moved to a circuit-closing position by a reverse movement of said part.

18. In an electric brake-system, the combination with a brake of a vehicle, of an electric appliance in operative connection with said brake, a switch in circuit with said appliance, an automatic switch in circuit with said appliance and connected with a rotary part of the vehicle to be moved to a circuit-closing position by a reverse movement of said part, and a switch in the circuit of the automatic switch for deënergizing the said appliance when the automatic switch is in its closed position.

In testimony whereof I have affixed my signature in presence of two witnesses.

NATHAN FALLEK.

Witnesses:
G. J. ROLLANDET,
L. RHOADES.